(12) United States Patent
Li et al.

(10) Patent No.: US 10,353,508 B2
(45) Date of Patent: Jul. 16, 2019

(54) TOUCH DISPLAY PANEL AND TOUCH DISPLAY DEVICE

(71) Applicant: XIAMEN TIANMA MICRO-ELECTRONICS CO., LTD., Xiamen (CN)

(72) Inventors: Jieliang Li, Xiamen (CN); Yong Yuan, Shanghai (CN); Zaiwen Zhu, Xiamen (CN); Qitai Ji, Xiamen (CN); Qijun Yao, Shanghai (CN); Feng Lu, Shanghai (CN)

(73) Assignee: XIAMEN TIANMA MICRO-ELECTRONICS CO., LTD., Xiamen (CN)

( * ) Notice: Subject to any disclaimer, the term of this patent is extended or adjusted under 35 U.S.C. 154(b) by 0 days.

(21) Appl. No.: 15/880,603

(22) Filed: Jan. 26, 2018

(65) Prior Publication Data

US 2018/0150175 A1 May 31, 2018

(30) Foreign Application Priority Data

Jun. 30, 2017 (CN) .......................... 2017 1 0537778

(51) Int. Cl.
*G06F 3/041* (2006.01)
*G06F 3/045* (2006.01)
*G06F 3/044* (2006.01)

(52) U.S. Cl.
CPC ............ *G06F 3/0414* (2013.01); *G06F 3/044* (2013.01); *G06F 3/045* (2013.01); *G06F 3/0412* (2013.01); *G06F 2203/04103* (2013.01); *G06F 2203/04112* (2013.01)

(58) Field of Classification Search
CPC ...... G06F 3/0414; G06F 3/0412; G06F 3/044; G06F 2203/04103; G06F 3/04112
See application file for complete search history.

(56) References Cited

U.S. PATENT DOCUMENTS

| | | | | |
|---|---|---|---|---|
| 5,471,086 A | * | 11/1995 | Ipposhi ................. | G01L 9/0055 257/417 |
| 6,204,519 B1 | * | 3/2001 | Yamazaki ........... | H01L 27/1214 257/72 |
| 2010/0180695 A1 | * | 7/2010 | Sauder ................... | A01C 7/205 73/862.045 |
| 2014/0168139 A1 | * | 6/2014 | Ku .......................... | G09G 3/20 345/174 |

(Continued)

*Primary Examiner* — Mark Edwards
(74) *Attorney, Agent, or Firm* — Kilpatrick Townsend & Stockton LLP

(57) ABSTRACT

Provided are a touch display panel and a touch display device. The touch display panel includes at least one semiconductor pressure-sensing touch device, and the semiconductor pressure-sensing touch device includes a first pressure-sensitive resistor, a second pressure-sensitive resistor, a third pressure-sensitive resistor and a fourth pressure-sensitive resistor. A first end of the first pressure-sensitive resistor and a first end of the second pressure-sensitive resistor are connected to a first power inputting terminal, a second end of the first pressure-sensitive resistor and a first end of the fourth pressure-sensitive resistor are connected to a first sense signal measuring terminal, a second end of the fourth pressure-sensitive resistor and a second end of the third pressure-sensitive resistor are connected to a second power inputting terminal.

19 Claims, 15 Drawing Sheets

(56) References Cited

U.S. PATENT DOCUMENTS

2016/0009545 A1\* 1/2016 Fuji ................... G01L 9/0042
257/419
2017/0010740 A1\* 1/2017 Chuang ............... G06F 3/0416
2017/0261306 A1\* 9/2017 Ausserlechner ......... G01B 7/18

\* cited by examiner

-- Prior Art --

TOUCH DISPLAY PANEL AND TOUCH DISPLAY DEVICE

CROSS-REFERENCE TO RELATED APPLICATIONS

This application claims priority to Chinese patent application No. 201710537778. X filed on Jun. 30, 2017, the disclosure of which is incorporated herein by reference in its entirety.

TECHNICAL FIELD

The present disclosure relates to touch display technologies, and in particular to a touch display and a touch display device.

BACKGROUND

A pressure-sensing technology generally provides a display screen with a pressure-sensing device, which will bring different interaction effects depending on slight or heavy touches on the touch screen by a finger. Different levels of pressure such as a slight pressing, a normal touching, and a heavy pressing etc., can be sensed by the screen, thereby achieving more varieties of operation modes.

Normally, the semiconductor pressure-sensing device provides a larger pressure-sensitive coefficient than the normal metallic pressure-sensing device, that is, the sensitivity of the semiconductor pressure-sensing device is higher than that of the metallic pressure-sensing device. FIG. 1 a schematic structural diagram of a semiconductor pressure-sensing touch device in a prior art. As shown in FIG. 1, the semiconductor pressure-sensing touch device includes a first pressure-sensitive resistor $R_1$, a second pressure-sensitive resistor $R_2$, a third pressure-sensitive resistor $R_3$ and a fourth pressure-sensitive resistor $R_4$, which form an electric bridge structure.

A first end a1 of the first pressure-sensitive resistor $R_1$ and a first end a2 of the second pressure-sensitive resistor $R_2$ are electrically connected to a first power inputting terminal Vcc, a second end b1 of the first pressure-sensitive resistor $R_1$ and a first end a4 of the fourth pressure-sensitive resistor $R_4$ are electrically connected to a first sense signal measuring terminal V+, a second end b4 of the fourth pressure-sensitive resistor $R_4$ and a second end b3 of the third pressure-sensitive resistor $R_3$ are electrically connected to a second power inputting terminal (e.g. GND terminal), a second end b2 of the second pressure-sensitive resistor $R_2$ and a first end a3 of the third pressure-sensitive resistor $R_3$ are electrically connected to a second sense signal measuring terminal V−. The semiconductor pressure-sensing touch device shown in FIG. 1 may be equivalent to a Wheatstone-bridge structure, the first pressure-sensitive resistor $R_1$, the second pressure-sensitive resistor $R_2$, the third pressure-sensitive resistor $R_3$ and the fourth pressure-sensitive resistor $R_4$ are connected to form a quadrangle ABCD which is called as four arms of the bridge. A diagonal line BD of the quadrangle ABCD is connected with a galvanometer G, and the two poles of the galvanometer G are, the first sense signal measuring terminal V+ and a second sense signal measuring terminal V−, respectively, a diagonal line AC of the quadrangle ABCD is connected to the first power inputting terminal Vcc and the second power inputting terminal GND. When a difference occurs between the voltages on the first power inputting terminal Vcc and the second power inputting terminal GND, the current flows through each branch of the bridge. When the resistance of the first pressure-sensitive resistor $R_1$, the second pressure-sensitive resistor $R_2$, the third pressure-sensitive resistor $R_3$ and the fourth pressure-sensitive resistor $R_4$ satisfies $$\frac{R_1}{R_4} = \frac{R_2}{R_3},$$

the potential of point B is equal to that of point D, and hence the current which flows through the galvanometer G is zero and the pointer of the galvanometer G points to a zero, thereby enabling the bridge in a balance state and $$\frac{R_1}{R_4} = \frac{R_2}{R_3}$$

is also called as a balance condition. When the resistance of the first pressure-sensitive resistor $R_1$, the second pressure-sensitive resistor $R_2$, the third pressure-sensitive resistor $R_3$ and the fourth pressure-sensitive resistor $R_4$ is not satisfied with above balance condition, the potential of point B is not equal to that of point D, and the current which flows through the galvanometer G is not zero, and the pointer of the galvanometer G deflects and the corresponding signal value is outputted, so that the pressure value may be determined.

The semiconductor pressure-sensing touch device is generally made in a laser crystallization scanning manner. Referring to FIG. 1, the laser crystallization scanning direction is parallel to the long side direction of the first pressure-sensitive resistor $R_1$, and is perpendicular to the long side direction of the second pressure-sensitive resistor $R_2$. Since the direction of the current which flows through the first pressure-sensitive resistor $R_1$ and the second pressure-sensitive resistor $R_2$ is different from the laser crystallization scanning direction, a slight difference in the resistances of the first pressure-sensitive resistor $R_1$, the second pressure-sensitive resistor $R_2$, the third pressure-sensitive resistor $R_3$ and the fourth pressure-sensitive resistor $R_4$ would occur, so that the balance condition $$\frac{R_1}{R_4} = \frac{R_2}{R_3}$$

of the bridge may not be satisfied. That is, when the pressure touch is not operated, $$\frac{R_1}{R_4} \neq \frac{R_2}{R_3},$$

so that the accuracy of the touch pressure detection is decreased.

SUMMARY

The present disclosure provides a touch display panel and a touch display device so as to improve the accuracy of the touch pressure detection.

In a first aspect, the present disclosure provides a touch display panel, comprising at least one semiconductor pressure-sensing touch device, and the semiconductor pressure-sensing touch device includes a first pressure-sensitive resistor, a second pressure-sensitive resistor, a third pressure-sensitive resistor and a fourth pressure-sensitive resistor; a first end of the first pressure-sensitive resistor and a first end of the second pressure-sensitive resistor are connected to a first power inputting terminal, a second end of the first pressure-sensitive resistor and a first end of the fourth pressure-sensitive resistor are connected to a first sense signal measuring terminal, a second end of the fourth pressure-sensitive resistor and a second end of the third pressure-sensitive resistor are connected to a second power inputting terminal, a first end of the third pressure-sensitive resistor and a second end of the second pressure-sensitive resistor are connected to a second sense signal measuring terminal; and $$\frac{L_1}{W_1} > \frac{L_2}{W_2}; \frac{L_1}{W_1} > \frac{L_4}{W_4}; \frac{L_3}{W_3} > \frac{L_2}{W_2}; \frac{L_3}{W_3} > \frac{L_4}{W_4};$$

so that when touch display panel is not applied by a touch pressure, $$\frac{R_1}{R_4} = \frac{R_2}{R_3};$$

$L_1$ is a length of the first pressure-sensitive resistor in the direction parallel to a laser crystallization scanning direction of the semiconductor pressure-sensing touch device, and $L_3$ is the length of the third pressure-sensitive resistor in the direction parallel to the laser crystallization scanning direction of the semiconductor pressure-sensing touch device; $W_1$ is the length of the first pressure-sensitive resistor in the direction perpendicular to the laser crystallization scanning direction of the semiconductor pressure-sensing touch device and $W_3$ is the length of the third pressure-sensitive resistor perpendicular to the laser crystallization scanning direction of the semiconductor pressure-sensing touch device; $L_2$ is the length of the second pressure-sensitive resistor in the direction perpendicular to the laser crystallization scanning direction of the semiconductor pressure-sensing touch device and $L_4$ is the length of the fourth pressure-sensitive resistor in the direction perpendicular to the laser crystallization scanning direction of the semiconductor pressure-sensing touch device; $W_2$ is a length of the second pressure-sensitive resistor in the direction parallel to the laser crystallization scanning direction of the semiconductor pressure-sensing touch device and $W_4$ is the length of the fourth pressure-sensitive resistor in the direction parallel to the laser crystallization scanning direction of the semiconductor pressure-sensing touch device; and $R_1$, $R_2$, $R_3$ and $R_4$ represent the resistances of the first pressure-sensitive resistor, the second pressure-sensitive resistor, the third pressure-sensitive resistor and the fourth pressure-sensitive resistor of the touch display panel without applied pressure, respectively.

In a second aspect, the present disclosure further provides a touch display device, including a touch display panel according to the first aspect.

In the present disclosure, by adjusting the lengths of the first pressure-sensitive resistor $R_1$, the second pressure-sensitive resistor $R_2$, the third pressure-sensitive resistor $R_3$ and the fourth pressure-sensitive resistor $R_4$ in the direction parallel to the laser crystallization scanning direction of the semiconductor pressure-sensing touch device and the lengths of the first pressure-sensitive resistor $R_1$, the second pressure-sensitive resistor $R_2$, the third pressure-sensitive resistor $R_3$ and the fourth pressure-sensitive resistor $R_4$ in the direction perpendicular to the laser crystallization scanning direction of the semiconductor pressure-sensing touch device, and satisfying $$\frac{L_1}{W_1} > \frac{L_2}{W_2}; \frac{L_1}{W_1} > \frac{L_4}{W_{42}}; \frac{L_3}{W_3} > \frac{L_2}{W_2}; \frac{L_3}{W_3} > \frac{L_4}{W_4},$$

which enables the first pressure-sensitive resistor, the second pressure-sensitive resistor, the third pressure-sensitive resistor and the fourth pressure-sensitive resistor to satisfy the $$\frac{R_1}{R_4} = \frac{R_2}{R_3}$$

when the touch display panel is not applied with a pressure touch, and avoiding the initial imbalance problem of the bridge caused by the difference in the resistances of the first pressure-sensitive resistor $R_1$, the second pressure-sensitive resistor $R_2$, the third pressure-sensitive resistor $R_3$ and the fourth pressure-sensitive resistor $R_4$ of the same semiconductor pressure-sensing touch device 10 relative to the laser crystallization scanning direction of the semiconductor pressure-sensing touch device, and the accuracy of the touch pressure detection is increased.

BRIEF DESCRIPTION OF DRAWINGS

A brief description for the drawings which employed in the detailed description of the present disclosure will be given as follows.

DETAILED DESCRIPTION

Figure 2:
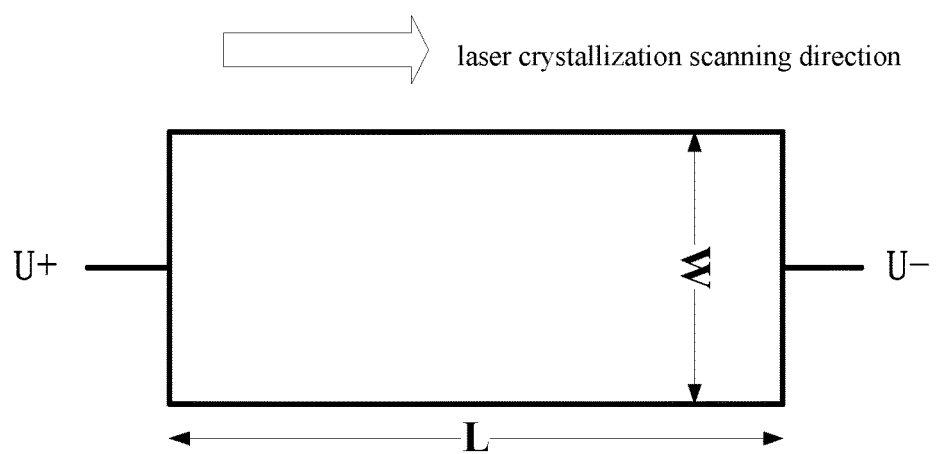
FIG. 2 is a structural diagram showing that a laser crystallization scanning direction is parallel to the resistance measuring direction.
Figure 3:
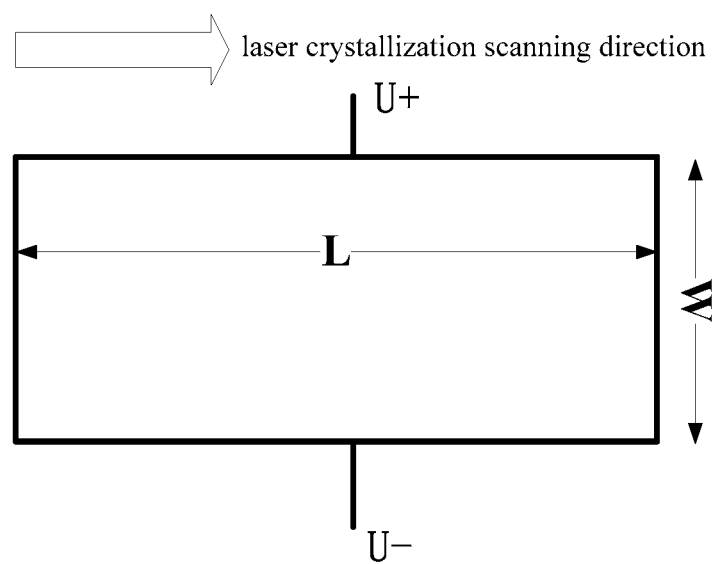
FIG. 3 is a structural diagram showing that a laser crystallization scanning direction is perpendicular to the resistance measuring direction.

FIG. 2 is a structural diagram showing that a laser crystallization scanning direction is parallel to the resistance measuring direction. FIG. 3 is a structural diagram showing that a laser crystallization scanning direction is perpendicular to the resistance measuring direction. Table 1 shows different measured resistances with respect to the different width-to-the-length ratios of the resistor along the direction parallel to the laser crystallization scanning direction and along the direction perpendicular to the laser crystallization scanning direction. The U+ and U− in FIG. 2 and FIG. 3 are two measuring terminal of the measuring resistor, respectively. L is the length of a side of the resistor parallel to the laser crystallization scanning direction, and W is the length of a side of the resistor perpendicular to the laser crystallization scanning direction. In Table 1, A is represented as the case in FIG. 2 that the laser crystallization scanning direction is parallel to resistance measuring direction, and B is represented as the case in FIG. 3 that the laser crystallization scanning direction is perpendicular to resistance measuring direction. As known in Table 1, the resistance of the resistor measured when the laser crystallization scanning direction is parallel to resistance measuring direction is less than that of the resistor measured when the laser crystallization scanning direction is perpendicular to resistance measuring direction.

TABLE 1

| | case | |
| L/W | A(ohm) | B(ohm) |
| --- | --- | --- |
| 80/100 | 1021 | 1100 |
| 100/100 | 1177 | 1325 |
| 120/100 | 1464 | 1826 |

Figure 1:
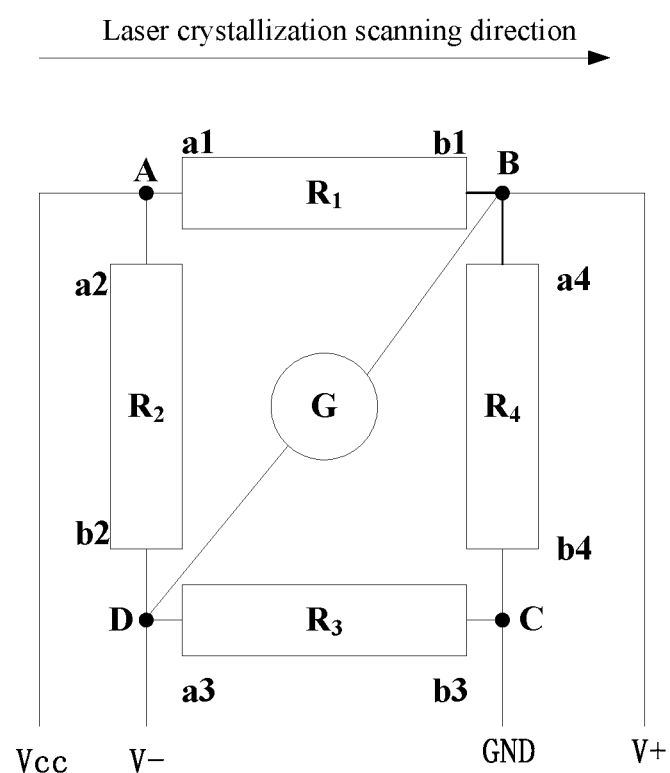
FIG. 1 is a structural diagram showing a pressure-sensing touch device according to the conventional technology.

Therefore, when the laser crystallization scanning direction is along the direction of the conventional technology shown in FIG. 1, a slight difference in the resistances of the first pressure-sensitive resistor $R_1$, the second pressure-sensitive resistor $R_2$, the third pressure-sensitive resistor $R_3$ and the fourth pressure-sensitive resistor $R_4$ shown in FIG. 1 would occur. When the pressure touch is not operated, the semiconductor pressure-sensing touch device may not satisfy an initial bridge balance condition $$\frac{R_1}{R_4} = \frac{R_2}{R_3}.$$

Namely, when the pressure touch is not operated, $$\frac{R_1}{R_4} \ne \frac{R_2}{R_3},$$

and the accuracy of the touch pressure detection is decreased. For example, if $R_1=R_2=R_3=R_4$ is configured, as the laser crystallization scanning direction of $R_1$ and $R_3$ is parallel to the direction of current flows through the resistors (equivalent to the resistance measuring direction), and the laser crystallization scanning direction of $R_2$ and $R_4$ is perpendicular to the direction of current which flows through the resistors (equivalent to the resistance measuring direction), and hence $R_1=R_3<R_2=R_4$, so that $$\frac{R_1}{R_4} \ne \frac{R_2}{R_3}.$$

Figure 4:
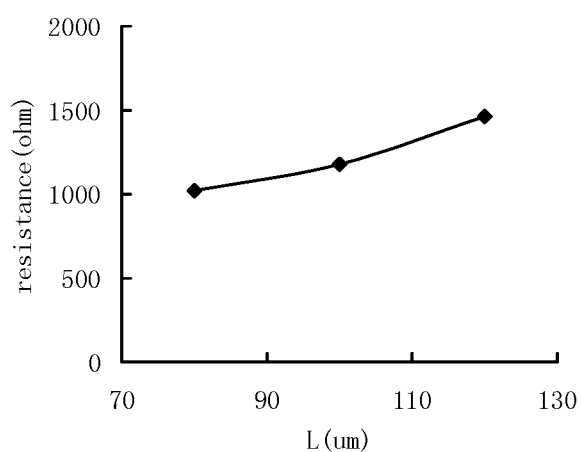
FIG. 4 is a graph showing the resistance variation with respect to the length along the laser crystallization scanning direction when the laser crystallization scanning direction is parallel to the resistance measuring direction.
Figure 5:
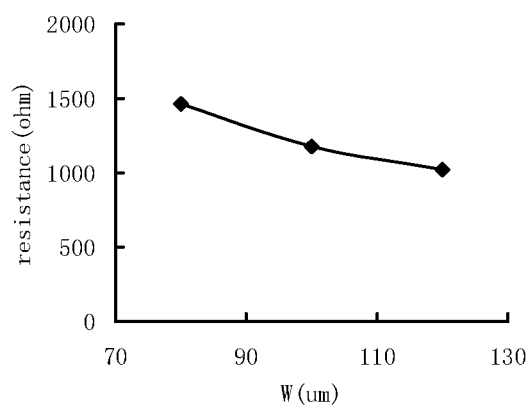
FIG. 5 is a graph showing the resistance variation with respect to the length perpendicular to the laser crystallization scanning direction when the laser crystallization scanning direction is parallel to the resistance measuring direction.

From the experiments and researches, the inventor found that, as shown in FIG. 4, when the laser crystallization scanning direction is parallel to the resistance measuring direction, if the length of the resistor along the laser crystallization scanning direction is increased, then the measured resistance of the resistor along the laser crystallization scanning direction is increased. In FIG. 4, the horizontal ordinate indicates the length L of the resistor along the laser crystallization scanning direction, and the vertical ordinate indicates the measured resistance. As shown in FIG. 5, when the laser crystallization scanning direction is parallel to the resistance measuring direction, if the length of the resistor in the direction perpendicular to the laser crystallization scanning direction is increased, then the measured resistance of the resistor along the laser crystallization scanning direction is decreased. In FIG. 5, the horizontal ordinate indicates the length W of the resistor in the direction perpendicular to the laser crystallization scanning direction, and vertical ordinate indicates the measured resistance.

Figure 6:
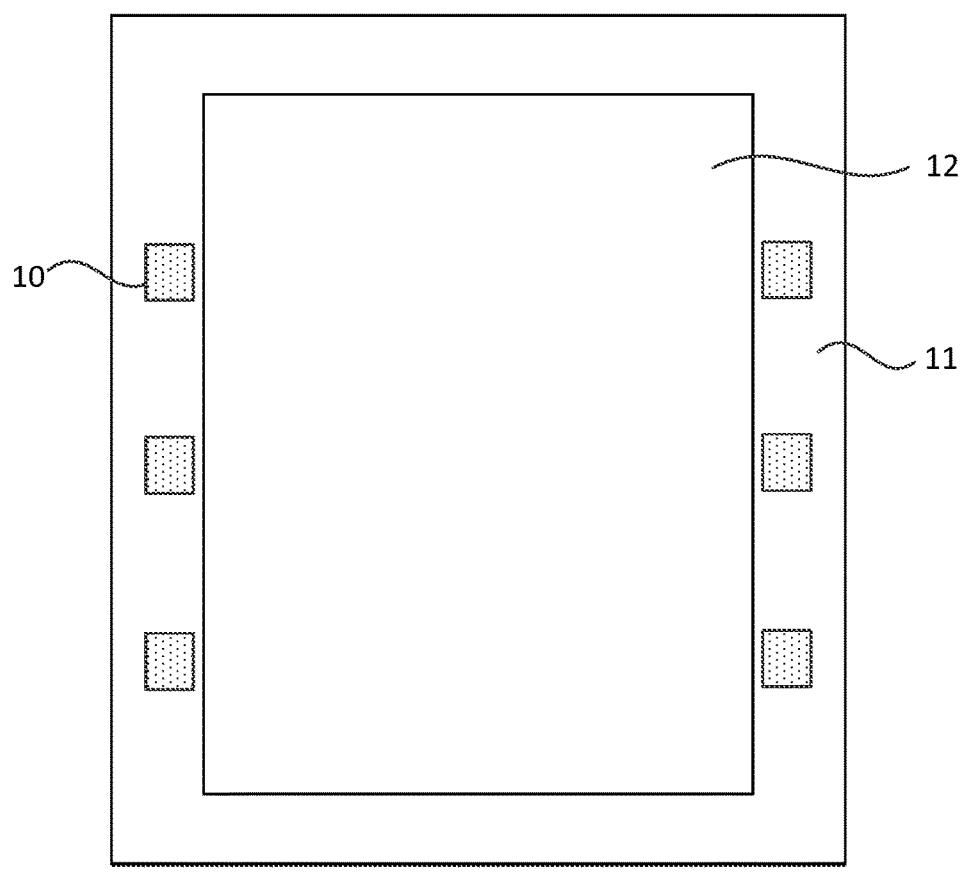
FIG. 6 is a structural diagram showing a touch display panel according to an embodiment of the present disclosure.

Therefore, a touch display panel is provided by the present disclosure, FIG. 6 is a structural diagram showing a touch display panel according to an embodiment of the present disclosure. Referring to FIG. 6, the touch display panel includes at least a semiconductor pressure-sensing touch device 10. Exemplarily, six semiconductor pressure-sensing touch devices are disposed in FIG. 6. The number of the semiconductor pressure-sensing touch devices disposed in the touch display panel is not limited in the present disclosure. It should be noted that, in order to avoid the affections on the pixel aperture ratio and light transmittance of the touch display panel by the semiconductor pressure-sensing touch device 10, in FIG. 6, the semiconductor pressure-sensing touch device 10 is disposed exemplarily in the non-display region 11 of the touch display panel. In other embodiments, the semiconductor pressure-sensing touch device 10 may be disposed in the display region 12 according to practical applications.

Figure 7:
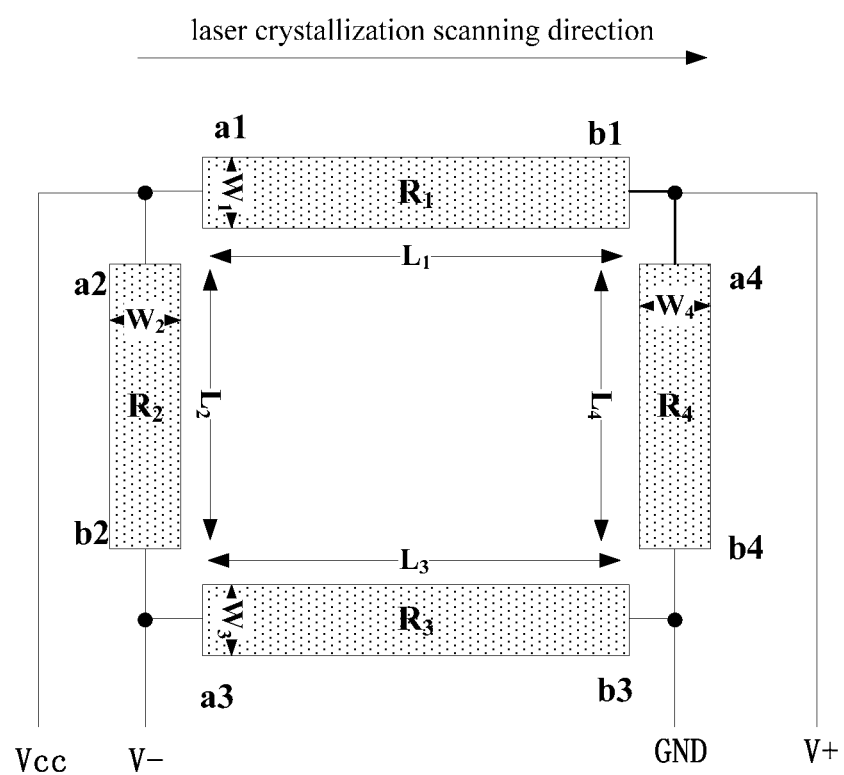
FIG. 7 is a structural diagram showing a semiconductor pressure-sensing touch device according to an embodiment of the present disclosure.

FIG. 7 is a structural diagram showing a semiconductor pressure-sensing touch device according to an embodiment of the present disclosure. As shown in FIG. 7, the semiconductor pressure-sensing touch device includes a first pressure-sensitive resistor $R_1$, a second pressure-sensitive resistor $R_2$, a third pressure-sensitive resistor $R_3$ and a fourth pressure-sensitive resistor $R_4$. A first end a1 of the first pressure-sensitive resistor $R_1$ and a first end a2 of the second pressure-sensitive resistor $R_2$ are electrically connected to a first power inputting terminal Vcc, a second end b1 of the first pressure-sensitive resistor $R_1$ and a first end a4 of the fourth pressure-sensitive resistor $R_4$ are electrically connected to a first sense signal measuring terminal V+, a second end b4 of the fourth pressure-sensitive resistor $R_4$ and a second end b3 of the third pressure-sensitive resistor $R_3$ are electrically connected to a second power inputting terminal (e.g. GND terminal), a second end b2 of the second pressure-sensitive resistor $R_2$ and a first end a3 of the third pressure-sensitive resistor $R_3$ are electrically connected to a second sense signal measuring terminal V−. The arrow direction in FIG. 7 indicates a laser crystallization scanning direction of the semiconductor pressure-sensing touch device.

Based on the FIG. 4 and FIG. 5, in order to avoid the initial imbalance problem of the bridge caused by the difference in the resistances of the first pressure-sensitive resistor $R_1$, the second pressure-sensitive resistor $R_2$, the third pressure-sensitive resistor $R_3$ and the fourth pressure-sensitive resistor $R_4$ of the same semiconductor pressure-sensing touch device 10 relative to the laser crystallization scanning direction of the semiconductor pressure-sensing touch device, the present disclosure provides the configuration as $$\frac{L_1}{W_1} > \frac{L_2}{W_2}; \frac{L_1}{W_1} > \frac{L_4}{W_4}; \frac{L_3}{W_3} > \frac{L_2}{W_2}; \frac{L_3}{W_3} > \frac{L_4}{W_4},$$

which enables the touch display panel to keep $$\frac{R_1}{R_4} = \frac{R_2}{R_3}$$

without the applied touch pressure. Namely, the ratios $$\frac{L_1}{W_1}, \frac{L_3}{W_3}$$

of the lengths of the first pressure-sensitive resistor $R_1$ and the third pressure-sensitive resistor $R_3$ in the direction parallel to the laser crystallization scanning direction of the semiconductor pressure-sensing touch device 10 to those of the first pressure-sensitive resistor $R_1$ and the third pressure-sensitive resistor $R_3$ in the direction perpendicular to the laser crystallization scanning direction of the semiconductor pressure-sensing touch device 10 are increased; or the ratios $$\frac{L_2}{W_2}, \frac{L_4}{W_4}$$

of the lengths of the second pressure-sensitive resistor $R_2$ and the fourth pressure-sensitive resistor $R_4$ in the direction parallel to the laser crystallization scanning direction of the semiconductor pressure-sensing touch device 10 to those of the second pressure-sensitive resistor $R_2$ and the fourth pressure-sensitive resistor $R_4$ in the direction perpendicular to the laser crystallization scanning direction of the semiconductor pressure-sensing touch device 10 are decreased, and thereby the resistances of the first pressure-sensitive resistor $R_1$ and the third pressure-sensitive resistor $R_3$ are increased, or the resistances of the second pressure-sensitive resistor $R_2$ and the fourth pressure-sensitive resistor $R_4$ are decreased, and hence the touch display panel may satisfy the balance condition $$\frac{R_1}{R_4} = \frac{R_2}{R_3}$$

without the applied touch pressure. $L_1$ is a length of the first pressure-sensitive resistor $R_1$ in the direction parallel to a laser crystallization scanning direction of the semiconductor pressure-sensing touch device 10, and $L_3$ is the length of the third pressure-sensitive resistor $R_3$ in the direction parallel to the laser crystallization scanning direction of the semiconductor pressure-sensing touch device 10; $W_1$ is the length of the first pressure-sensitive resistor $R_1$ in the direction perpendicular to the laser crystallization scanning direction of the semiconductor pressure-sensing touch device 10, and $W_3$ is the length of the third pressure-sensitive resistor $R_3$ in the direction perpendicular to the laser crystallization scanning direction of the semiconductor pressure-sensing touch device 10; $L_2$ is the length of the second pressure-sensitive resistor $R_2$ in the direction perpendicular to the laser crystallization scanning direction of the semiconductor pressure-sensing touch device 10 and $L_4$ is the length of the fourth pressure-sensitive resistor $R_4$ in the direction perpendicular to the laser crystallization scanning direction of the semiconductor pressure-sensing touch device 10; $W_2$ is a length of the second pressure-sensitive resistor $R_2$ in the direction parallel to the laser crystallization scanning direction of the semiconductor pressure-sensing touch device 10 and $W_4$ is the length of the fourth pressure-sensitive resistor $R_4$ in the direction parallel to the laser crystallization scanning direction of the semiconductor pressure-sensing touch device 10; and $R_1$, $R_2$, $R_3$ and $R_4$ represent the resistances of the first pressure-sensitive resistor, the second pressure-sensitive resistor, third pressure-sensitive resistor and the fourth pressure-sensitive resistor of the touch display panel without the applied pressure, respectively.

In one embodiment, from the conventional technology shown in FIG. 1, $w_1$ is the length of the first pressure-sensitive resistor $R_1$ in the direction perpendicular to the laser crystallization scanning direction of the semiconductor pressure-sensing touch device 10, and $w_3$ is the length of the third pressure-sensitive resistor $R_3$ in the direction perpendicular to the laser crystallization scanning direction of the semiconductor pressure-sensing touch device 10, $w_2$ is the length of the second pressure-sensitive resistor $R_2$ in the direction parallel to the laser crystallization scanning direction of the semiconductor pressure-sensing touch device 10, and $w_4$ is the length of the fourth pressure-sensitive resistor $R_4$ in the direction parallel to the laser crystallization scanning direction of the semiconductor pressure-sensing touch device 10; $l_1$ is the length of the first pressure-sensitive resistor $R_1$ in the direction parallel to the laser crystallization scanning direction of the semiconductor pressure-sensing touch device 10, and $l_3$ is the length of the third pressure-sensitive resistor $R_3$ in the direction parallel to the laser crystallization scanning direction of the semiconductor pressure-sensing touch device 10, $l_2$ is the length of the second pressure-sensitive resistor $R_2$ in the direction perpendicular to the laser crystallization scanning direction of the semiconductor pressure-sensing touch device 10 and $l_4$ is the length of the fourth pressure-sensitive resistor $R_4$ in the direction parallel to the laser crystallization scanning direction of the semiconductor pressure-sensing touch device 10.

From the convention technology shown in FIG. 1, the length $w_1$ of the first pressure-sensitive resistor $R_1$ in the direction perpendicular to the laser crystallization scanning direction of the semiconductor pressure-sensing touch device 10, the length $w_3$ of the third pressure-sensitive resistor $R_3$ in the direction perpendicular to the laser crystallization scanning direction of the semiconductor pressure-sensing touch device 10, the length $w_2$ of the second pressure-sensitive resistor $R_2$ in the direction parallel to the laser crystallization scanning direction of the semiconductor pressure-sensing touch device 10, the length $w_4$ of the fourth pressure-sensitive resistor $R_4$, in the direction parallel to the laser crystallization scanning direction of the semiconductor pressure-sensing touch device 10, the length $l_2$ of the second pressure-sensitive resistor $R_2$ in the direction perpendicular to the laser crystallization scanning direction of the semiconductor pressure-sensing touch device 10 and the length $l_4$ of the fourth pressure-sensitive resistor $R_4$ in the direction parallel to the laser crystallization scanning direction of the semiconductor pressure-sensing touch device 10 are kept unchanged, and the length $l_1$ of the first pressure-sensitive resistor $R_1$ in the direction parallel to the laser crystallization scanning direction of the semiconductor pressure-sensing touch device 10 and the length $l_3$ of the third pressure-sensitive resistor $R_3$ in the direction parallel to the laser crystallization scanning direction of the semiconductor pressure-sensing touch device 10 in FIG. 1 are increased, so that the structure of the semiconductor pressure-sensing touch device shown in FIG. 7 of the present disclosure may be achieved. $w_1=W_1$; $w_2=W_2$; $w_3=W_3$; $w_4=W_4$; $l_2=L_2$; $l_4=L_4$; $l_1<l_3<L_3$, which enables the structure of the semiconductor pressure-sensing touch device shown in FIG. 7 to satisfy $L_1>L_2$; $L_1>L_4$; $L_3>L_2$; $L_3>L_4$, so that the initial balance condition $$\frac{R_1}{R_4} = \frac{R_2}{R_3}$$

of the bridge is satisfied when the touch display panel is not applied a touch pressure.

In one embodiment, from the convention technology shown in FIG. 1, the length of the first pressure-sensitive resistor $R_1$ in the direction perpendicular to the laser crystallization scanning direction of the semiconductor pressure-sensing touch device 10, the length $w_3$ of the third pressure-sensitive resistor $R_3$ in the direction perpendicular to the laser crystallization scanning direction of the semiconductor pressure-sensing touch device 10, the length $w_2$ of the second pressure-sensitive resistor $R_2$ in the direction parallel to the laser crystallization scanning direction of the semiconductor pressure-sensing touch device 10, the length $w_4$ of the fourth pressure-sensitive resistor $R_4$ in the direction parallel to the laser crystallization scanning direction of the semiconductor pressure-sensing touch device 10, the length $l_1$ of the first pressure-sensitive resistor $R_1$ in the direction parallel to the laser crystallization scanning direction of the semiconductor pressure-sensing touch device 10 and the length $l_3$ of the third pressure-sensitive resistor $R_3$ in the direction parallel to the laser crystallization scanning direction of the semiconductor pressure-sensing touch device 10 are kept unchanged, and the length $l_2$ of the second pressure-sensitive resistor $R_2$ in the direction perpendicular to the laser crystallization scanning direction of the semiconductor pressure-sensing touch device 10 and the length $l_4$ of the fourth pressure-sensitive resistor $R_4$ in the direction perpendicular to the laser crystallization scanning direction of the semiconductor pressure-sensing touch device 10 in FIG. 1 are decreased, so that the structure of the semiconductor pressure-sensing touch device shown in FIG. 7 of the present disclosure may be achieved, $w_1=W_1$; $w_2=W_2$; $w_3=W_3$; $w_4=W_4$; $l_1=L_1$; $l_3=L_3$; $l_2>L_2$; $l_4>L_4$, which enables the structure of the semiconductor pressure-sensing touch device shown in FIG. 7 to satisfy $L_1>L_2$; $L_1>L_4$; $L_3>L_2$; $L_3>L_4$, so that the initial balance condition $$\frac{R_1}{R_4} = \frac{R_2}{R_3}$$

of the bridge is satisfied when the touch display panel is not applied a touch pressure.

In one embodiment, the length $l_1$ of the first pressure-sensitive resistor $R_1$ in the direction parallel to the laser crystallization scanning direction of the semiconductor pressure-sensing touch device 10, the length $l_3$ of the third pressure-sensitive resistor $R_3$ in the direction parallel to the laser crystallization scanning direction of the semiconductor pressure-sensing touch device 10, the length $l_2$ of the second pressure-sensitive resistor $R_2$ in the direction perpendicular to the laser crystallization scanning direction of the semiconductor pressure-sensing touch device 10, the length $l_4$ of the fourth pressure-sensitive resistor $R_4$ in the direction parallel to the laser crystallization scanning direction of the semiconductor pressure-sensing touch device 10, the length $w_2$ of the second pressure-sensitive resistor $R_2$ in the direction parallel to the laser crystallization scanning direction of the semiconductor pressure-sensing touch device 10 and the length $w_4$ of the fourth pressure-sensitive resistor $R_4$ in the direction parallel to the laser crystallization scanning direction of the semiconductor pressure-sensing touch device 10 in FIG. 1 are kept unchanged, and the length $w_1$ of the first pressure-sensitive resistor $R_1$ in the direction perpendicular to the laser crystallization scanning direction of the semiconductor pressure-sensing touch device 10, the length $w_3$ of the third pressure-sensitive resistor $R_3$ in the direction perpendicular to the laser crystallization scanning direction of the semiconductor pressure-sensing touch device 10 in FIG. 1 are decreased, so that the structure of the semiconductor pressure-sensing touch device shown in FIG. 7 of the present disclosure may be achieved $l_1=L_1$; $l_2=L_2$; $l_3=L_3$; $l_4=L_4$; $w_2=W_2$; $w_4=W$; $w_1>W_1$; $w_3>W_3$, which enables the structure of the semiconductor pressure-sensing touch device shown in FIG. 7 to satisfy $W_1<W_2$; $W_1<W_4$; $W_3<W_2$; $W_3<W_4$, so that the initial balance condition $$\frac{R_1}{R_4} = \frac{R_2}{R_3}$$

of the bridge is satisfied when the touch display panel is not applied a touch pressure.

In one embodiment, from convention technology shown in FIG. 1, the length $l_1$ of the first pressure-sensitive resistor $R_1$ in the direction parallel to the laser crystallization scanning direction of the semiconductor pressure-sensing touch device 10, the length $l_3$ of the third pressure-sensitive resistor $R_3$ in the direction parallel to the laser crystallization scanning direction of the semiconductor pressure-sensing touch device 10, the length $l_2$ of the second pressure-sensitive resistor $R_2$ in the direction perpendicular to the laser crystallization scanning direction of the semiconductor pressure-sensing touch device 10, the length $l_4$ of the fourth pressure-sensitive resistor $R_4$ in the direction perpendicular to the laser crystallization scanning direction of the semiconductor pressure-sensing touch device 10, the length $w_1$ of the first pressure-sensitive resistor $R_1$ in the direction perpendicular to the laser crystallization scanning direction of the semiconductor pressure-sensing touch device 10 and the length $w_3$ of the third pressure-sensitive resistor $R_3$ in the direction perpendicular to the laser crystallization scanning direction of the semiconductor pressure-sensing touch device 10 are kept unchanged, and the length $w_2$ of the second pressure-sensitive resistor $R_2$ in the direction parallel to the laser crystallization scanning direction of the semiconductor pressure-sensing touch device 10 and the length $w_4$ of the fourth pressure-sensitive resistor $R_4$, in the direction parallel to the laser crystallization scanning direction of the semiconductor pressure-sensing touch device 10 in FIG. 1 are increased, so that the structure of the semiconductor pressure-sensing touch device shown in FIG. 7 of the present disclosure may be achieved $l_1=L_1$; $l_2=L_2$; $l_3=L_3$; $l_4=L_4$; $w_1=W_1$; $w_3=W_3$; $w_2<W_2$; $w_4<W_4$, which enables the structure of the semiconductor pressure-sensing touch device shown in FIG. 7 to satisfy $W_1<W_2$; $W_1<W_4$; $W_3<W_2$; $W_3<W_4$, so that the initial balance condition $$\frac{R_1}{R_4} = \frac{R_2}{R_3}$$

of the bridge is satisfied when the touch display panel is not applied a touch pressure.

In one embodiment, it may be provided as $R_1=R_2=R_3=R_4$; $L_1=L_3$; $L_2=L_4$; $W_1=W_3$; $W_2=W_4$. Therefore, when the touch display panel is not applied with a pressure, the potential of the first sense signal measuring terminal is equal to that of the second sense signal measuring terminal, and the pressure-sensitive detecting signals outputted by the first sense signal measuring terminal and the second sense signal measuring terminal are zero, which enables the calculation process of the pressure value to be simplified and improves the sensitivity of the pressure detection. The configurations of $L_1=L_3$; $L_2=L_4$; $W_1=W_3$; $W_2=W_4$ may also simplify the complexity of the fabrication of the semiconductor pressure-sensing touch device.

In one embodiment, based on above embodiments, the first pressure-sensitive resistor, the second pressure-sensitive resistor, the third pressure-sensitive resistor and the fourth pressure-sensitive resistor of the semiconductor pressure-sensing touch device may be made of polysilicon material which formed by the laser crystallization scanning of amorphous silicon material. In other embodiments, based on the design requirements of the touch display panel, other semiconductor materials may be selected to manufacture the first pressure-sensitive resistor, the second pressure-sensitive resistor, the third pressure-sensitive resistor and the fourth pressure-sensitive resistor of the semiconductor pressure-sensing touch device.

Figure 8:
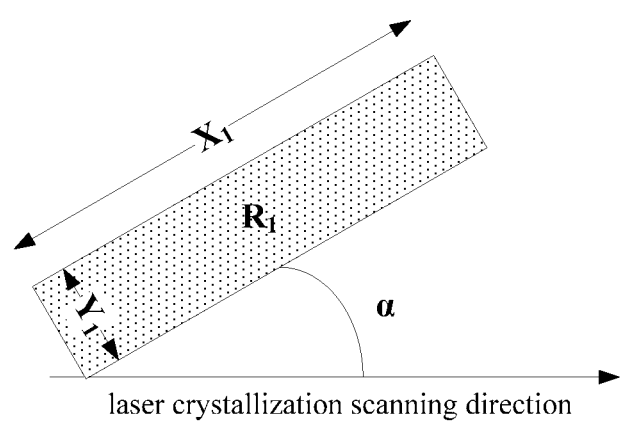
FIG. 8 is a diagram showing an effective length of the first pressure-sensitive $R_1$ parallel to the laser crystallization scanning direction of the semiconductor pressure-sensing touch device.

In one embodiment, in above technical solutions, the first pressure-sensitive resistor $R_1$, the second pressure-sensitive resistor $R_2$, the third pressure-sensitive resistor $R_3$ and the fourth pressure-sensitive resistor $R_4$ of the semiconductor pressure-sensing touch device may be a rectangle as shown in FIG. 7. The connecting wire between the first end a1 and the second end b1 of the first pressure-sensitive resistor $R_1$ and the connecting wire between the first end a3 and the second end b2 of the third pressure-sensitive resistor $R_3$ are parallel to the laser crystallization scanning direction of the semiconductor pressure-sensing touch device; and the connecting wire between the first end a2 and the second end b2 of the second pressure-sensitive resistor $R_2$ and the connecting wire between the first end a4 and the second end b4 of the fourth pressure-sensitive resistor $R_4$ are perpendicular to the laser crystallization scanning direction of the semiconductor pressure-sensing touch device. It should be noted that, the length of the first pressure-sensitive resistor $R_1$, the second pressure-sensitive resistor $R_2$, the third pressure-sensitive resistor $R_3$ and the fourth pressure-sensitive resistor $R_4$ of the semiconductor pressure-sensing touch device parallel to the laser crystallization scanning direction refers to the length parallel to the laser crystallization scanning direction of semiconductor pressure-sensing touch device, and the length of the first pressure-sensitive resistor $R_1$, the second pressure-sensitive resistor $R_2$, the third pressure-sensitive resistor $R_3$ and the fourth pressure-sensitive resistor $R_4$ of the semiconductor pressure-sensing touch device perpendicular to the laser crystallization scanning direction refers to the effective length perpendicular to the laser crystallization scanning direction of semiconductor pressure-sensing touch device. For example, in FIG. 7, the first pressure-sensitive resistor $R_1$, the second pressure-sensitive resistor $R_2$, the third pressure-sensitive resistor $R_3$ and the fourth pressure-sensitive resistor $R_4$ are a rectangle, and connecting wire between the first end a1 and the second end b1 of the first pressure-sensitive resistor is a long side of the first pressure-sensitive resistor $R_1$, and connecting wire between the first end a1 and the second end b1 of the first pressure-sensitive resistor $R_1$ is parallel to the laser crystallization scanning direction of the semiconductor pressure-sensing touch device, and hence the long side of the first pressure-sensitive resistor $R_1$ is a length $L_1$ in the direction parallel to the laser crystallization scanning direction of semiconductor pressure-sensing touch device, and a short side of the first pressure-sensitive resistor $R_1$ is a length $W_1$ in the direction parallel to the laser crystallization scanning direction of semiconductor pressure-sensing touch device. In other embodiments, if an angle exists between the long side of the first pressure-sensitive resistor $R_1$, the second pressure-sensitive resistor $R_2$, the third pressure-sensitive resistor $R_3$ and the fourth pressure-sensitive resistor $R_4$ and the laser crystallization scanning direction of semiconductor pressure-sensing touch device, as shown in FIG. 8, the first pressure-sensitive resistor $R_1$ is a rectangle, $\alpha$ is an angle between the long side $X_1$ of the rectangle and the laser crystallization scanning direction of semiconductor pressure-sensing touch device, and thus $L_1=X_1 \cdot \cos \alpha$ is the length of the first pressure-sensitive resister $R_1$ parallel to laser crystallization scanning direction of semiconductor pressure-sensing touch device; $W_1=Y_1 \cdot \cos \alpha$ is the length of the long side $Y_1$ of the rectangle perpendicular to the laser crystallization scanning direction of semiconductor pressure-sensing touch device.

In one embodiment, the display region and the non-display region of the touch display panel include a plurality of thin film transistors, each thin film transistor includes an active layer, the semiconductor pressure-sensing touch device and the active layer may be manufactured at the same layer, so that the process may be reduced and simplified, and the production cost may be reduced.

In above technical solutions, the specific structure of the semiconductor pressure sensor of the touch display panel may be various, FIG. 7 only shows one of the classical structures thereof. Descriptions on several classical structures of the semiconductor pressure sensor are given as below and the structures of the semiconductor pressure sensor are not limited herein.

Figure 9:
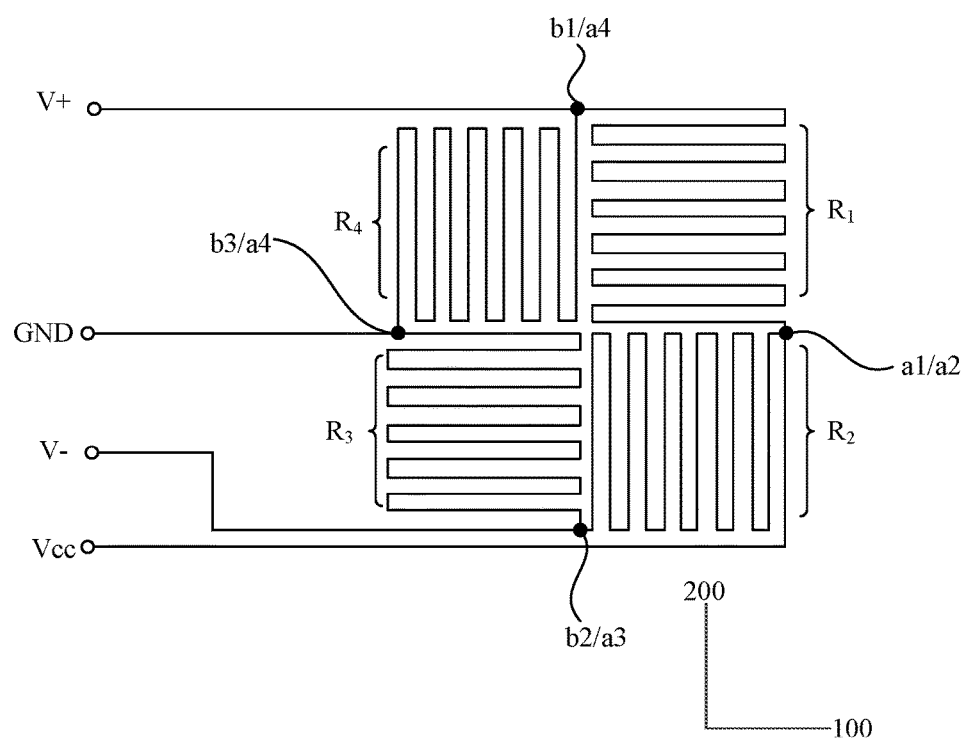
FIG. 9 is a structural diagram showing another semiconductor pressure-sensing touch device according to an embodiment of the present disclosure.

In one embodiment, FIG. 9 is a structural diagram showing a pressure sensor according to an embodiment of the present disclosure. The display panel includes a first extension direction 100 and a second extension direction 200, and the first extension direction 100 and the second extension direction 200 are configured to be intersected with each other. A component of extension length of the first pressure-sensitive resistor $R_1$ from the first end a1 to the second end b1 thereof in the first extension direction 100 may be longer than that in the second extension direction 200, the component of extension length of the second pressure-sensitive resistor $R_2$ from the first end a2 to the second end b2 thereof in the second extension direction 200 may be longer than that in the first extension direction 100, the component of extension length of the third pressure-sensitive resistor $R_3$ from the first end a3 to the second end b3 thereof in the first extension direction 100 is longer than that in the second extension direction 200, and the component of extension length of the fourth pressure-sensitive resistor $R_4$ from the first end a4 to the second end b4 thereof in the second extension direction 200 may be longer than that in the first extension direction 100. Referring to FIG. 9, the first pressure-sensitive resistor $R_1$, the second pressure-sensitive resistor $R_2$, the third pressure-sensitive resistor $R_3$ and the fourth pressure-sensitive resistor $R_4$ are configured to be similar to a serpentine structure.

In the semiconductor pressure-sensing touch device, the first pressure-sensitive resistor $R_1$, the second pressure-sensitive resistor $R_2$, the third pressure-sensitive resistor $R_3$ and the fourth pressure-sensitive resistor $R_4$ are generally necessary to sense different deformations. For example, a compressive deformation is sensed by the first pressure-sensitive resistor $R_1$ and the third pressure-sensitive resistor $R_3$, and a tensile deformation is sensed by the second pressure-sensitive resistor $R_2$ and the fourth pressure-sensitive resistor $R_4$. Therefore, referring to FIG. 7, the first pressure-sensitive resistor $R_1$, the second pressure-sensitive resistor $R_2$, the third pressure-sensitive resistor $R_3$ and the fourth pressure-sensitive resistor $R_4$ are spatially separated. As a temperature change occurs in the partial area of the semiconductor pressure-sensing touch device, which enables the first pressure-sensitive resistor $R_1$, the second pressure-sensitive resistor $R_2$, the third pressure-sensitive resistor $R_3$ and the fourth pressure-sensitive resistor $R_4$ to be in different temperature environment, and hence the temperature has different affections on the resistances of the first pressure-sensitive resistor $R_1$, the second pressure-sensitive resistor $R_2$, the third pressure-sensitive resistor $R_3$ and the fourth pressure-sensitive resistor $R_4$, thereby affecting the accuracy of the pressure detection performed by the semiconductor pressure-sensing touch device. The semiconductor pressure-sensing touch device provided in FIG. 9 enables the first pressure-sensitive resistor $R_1$ and the third pressure-sensitive resistor $R_3$ to sense the strain in the first extension direction 100, and enables the second pressure-sensitive resistor $R_2$ and the fourth pressure-sensitive resistor $R_4$ to sense the strain in the second extension direction 200. Since the strain sensing direction of the first pressure-sensitive resistor $R_1$ is different from that of the second pressure-sensitive resistor $R_2$, and the strain sensing direction of the fourth pressure-sensitive resistor $R_4$ is different from the third pressure-sensitive resistor $R_3$, the first pressure-sensitive resistor $R_1$, the second pressure-sensitive resistor $R_2$, the third pressure-sensitive resistor $R_3$ and the fourth pressure-sensitive resistor $R_4$ can be disposed in a same space or close to each other, which enables the first pressure-sensitive resistor $R_1$, the second pressure-sensitive resistor $R_2$, the third pressure-sensitive resistor $R_3$ and the fourth pressure-sensitive resistor $R_4$ to have a synchronous temperature change, so that the affection of the temperature difference is eliminated and the accuracy of pressure-sensing is increased.

In one embodiment, it is also possible that the first extension direction is the laser crystallization scanning direction of the semiconductor pressure-sensing touch device; and the second extension direction is perpendicular to the laser crystallization scanning direction of the semiconductor pressure-sensing touch device. In such a way, the calculation process of the pressure value is simplified and the complexity of the manufacture of the touch display panel is decreased, thereby improving the yield and the accuracy of the pressure touch.

In one embodiment, the semiconductor pressure-sensing touch device may also be a block and is made of semiconductor material, the shape of which is a polygon with at least four sides; a first connecting terminal, a second connecting terminal, a third connecting terminal and a fourth connecting terminal are disposed at the four sides of the polygon separately. The first connecting terminal is electrically connected to the first power inputting terminal; the second connecting terminal is electrically connected to the second power inputting terminal; the third connecting terminal is electrically connected to the first sense signal measuring terminal; the fourth connecting terminal is electrically connected to the second signal measuring terminal; a first line is a line where the first connecting terminal and the second connecting terminal are located, and a second line is a line where the third connecting terminal and the fourth connecting terminal are located. The angle $\theta_1$ between the first line and the laser crystallization scanning direction of the semiconductor pressure-sensing touch device, the angle $\theta_2$ between a side of the polygon where the first connecting terminal is located and a side of the polygon where the third connecting terminal is located, the angle $\theta_3$ between a side of the polygon where the second connecting terminal is located and a side of the polygon where the third connecting terminal is located, the angle $\theta_4$ between a side of the polygon where the second connecting terminal is located and a side of the polygon where the fourth connecting terminal is located and the angle $\theta_5$ between a side of the polygon where the first connecting terminal is located and a side of the polygon where the fourth connecting terminal is located satisfy the following conditions:

when $0°<\theta_1<90°$, $\theta_2>\theta_3$; $\theta_4>\theta_5$;

when $90°<\theta_1<180°, \theta_2<\theta_3$; $\theta_4<\theta_5$.

The positive direction of the angle $\theta_1$ is direction from the laser crystallization scanning direction of the semiconductor pressure-sensing touch device towards the first line.

Figure 10:
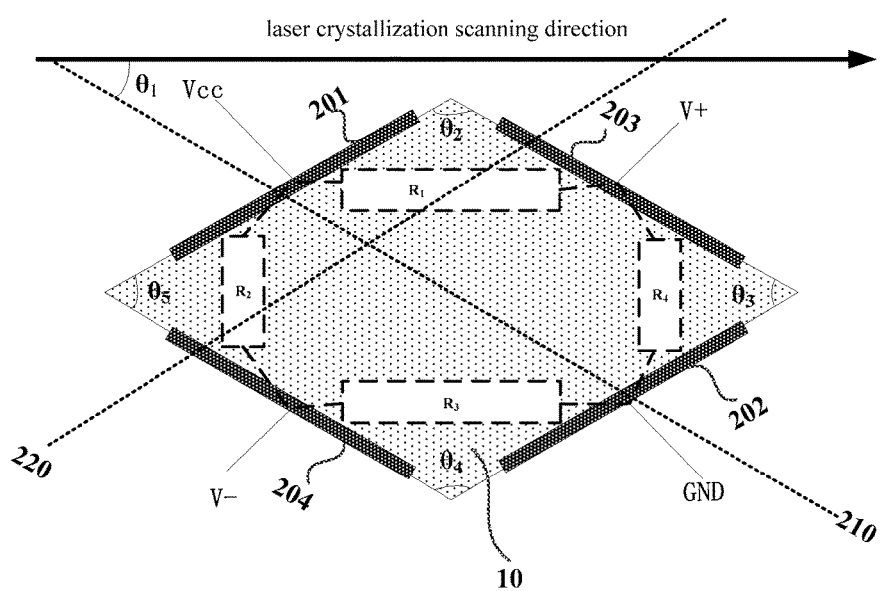
FIG. 10 is a structural diagram showing another semiconductor pressure-sensing touch device according to an embodiment of the present disclosure.

Exemplarily, FIG. 10 exemplarily shows that the semiconductor pressure-sensing touch device 10 is a quadrilateral, but the shape of the semiconductor pressure-sensing touch device is not limited in the present disclosure. Referring to FIG. 10, the semiconductor pressure-sensing touch device 10 is a quadrilateral, the first connecting terminal 201, the second connecting terminal 202, the third connecting terminal 203 and the fourth connecting terminal 204 are configured to be located at the first side, the second side, the third side and the fourth side of the quadrilateral, and the first side and the second side of the semiconductor pressure-sensing touch device 10 are configured to be opposite to each other, and the third side and the fourth side of the semiconductor pressure-sensing touch device 10 are configured to be opposite to each other. The first connecting terminal 201 is electrically connected to the first power inputting terminal Vcc, and the second connecting terminal 202 is electrically connected to the second power inputting terminal (e.g. GND terminal), and the third connecting terminal 203 is electrically connected to the first sense signal measuring terminal V+, and the fourth connecting terminal 204 is electrically connected to the second sense signal measuring terminal V−. The first power inputting terminal Vcc and the second power inputting terminal GND are configured to input a power driving signal; the first sense signal measuring terminal V+ and the second sense signal measuring terminal V− are configured to output a pressure detection signal from the semiconductor pressure-sensing touch device 10. The semiconductor pressure-sensing touch device 10 shown in FIG. 10 may be equivalent to a Wheatstone-bridge circuit formed by the first pressure-sensitive resistor $R_1$, the second pressure-sensitive resistor $R_2$, the third pressure-sensitive resistor $R_3$ and the fourth pressure-sensitive resistor $R_4$ indicated by the dash line in FIG. 10. The principle of operating the pressure detection is same with the detecting principle of the semiconductor pressure-sensing touch device shown in FIG. 7 and will not be described here.

A first line 210 is a line where the first connecting terminal 201 and the second connecting terminal 202 are located, and a second line 220 is a line where the third connecting terminal 203 and the fourth connecting terminal 204 are located; the angle $\theta_1$ between the first line 210 and the laser crystallization scanning direction of the semiconductor pressure-sensing touch device 10, the angle $\theta_2$ between a side of the polygon where the first connecting terminal 201 is located and a side of the polygon where the third connecting terminal 203 is located, the angle $\theta_3$ between a side of the polygon where the second connecting terminal 202 is located and a side of the polygon where the third connecting terminal 203 is located, the angle $\theta_4$ between a side of the polygon where the second connecting terminal 202 located and a side of the polygon where the fourth connecting terminal located 204 and the angle $\theta_5$ between a side of the polygon where the first connecting terminal 201 is located and a side of the polygon where the fourth connecting terminal 204 is located satisfy the following conditions:

When $0°<\theta_1<90°$, $\theta_2>\theta_3$; $\theta_4>\theta_5$;
When $90°<\theta_1<180°$, $\theta_2<\theta_3$; $\theta_4<\theta_5$.

The positive direction of the angle $\theta_1$ is direction from the laser crystallization scanning direction of the semiconductor pressure-sensing touch device towards the first line.

Figure 11:
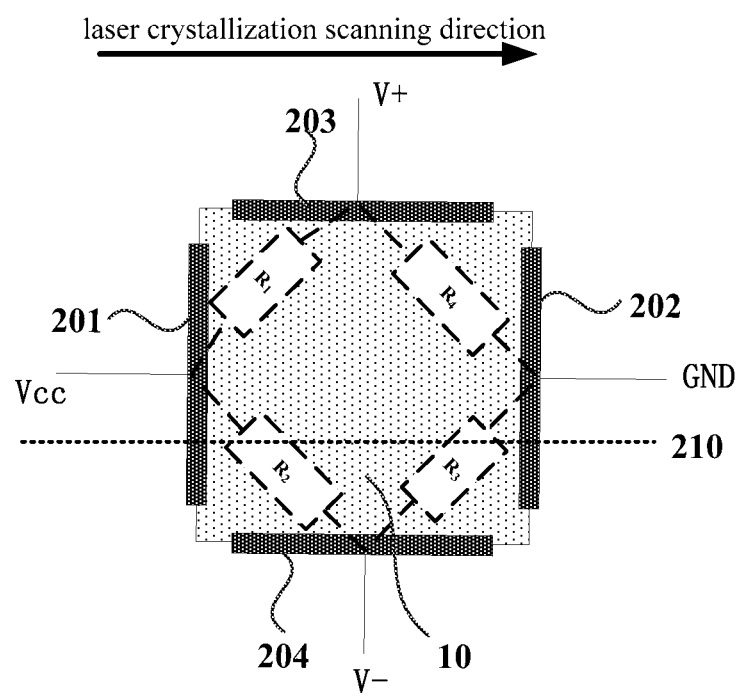
FIG. 11 is diagram showing the relationship between the position of a semiconductor pressure-sensing touch device and the laser crystallization scanning direction.

When the angle $\theta_1$ between the first line 210 and the laser crystallization scanning direction of the semiconductor pressure-sensing touch device 10 is equal to 0° or 90°, take $\theta_1=0°$ as an example. Referring to FIG. 11, the first pressure-sensitive resistor $R_1$ as an equivalent resistor between the first connecting terminal 201 and the third connecting terminal 203 is equal to the second pressure-sensitive resistor $R_2$ as an equivalent resistor between the first connecting terminal 201 and the fourth connecting terminal 204. The fourth pressure-sensitive resistor $R_4$ as an equivalent resistor between the second connecting terminal 202 and the third connecting terminal 203 is equal to the third pressure-sensitive resistor $R_3$ as an equivalent resistor between the second connecting terminal 202 and the fourth connecting terminal 204. Therefore, when the equivalent first pressure-sensitive resistor $R_1$, the equivalent second pressure-sensitive resistor $R_2$, the equivalent third pressure-sensitive resistor $R_3$ and the equivalent fourth pressure-sensitive resistor $R_4$ of the same semiconductor pressure-sensing touch device are different from each other relative to the laser crystallization scanning direction of semiconductor pressure-sensing touch device, the measured resistances are same, so that there is no initial imbalance of the bridge. The present disclosure is provided to solve the problem that when $0°<\theta_1<90°$, and $90°<\theta_1<180°$, since the equivalent first pressure-sensitive resistor, the equivalent second pressure-sensitive resistor, the equivalent third pressure-sensitive resistor and the equivalent fourth pressure-sensitive resistor of the same semiconductor pressure-sensing touch device are different from each other relative to the laser crystallization scanning direction semiconductor pressure-sensing touch device, the initial imbalance of the bridge is present.

Figure 12:
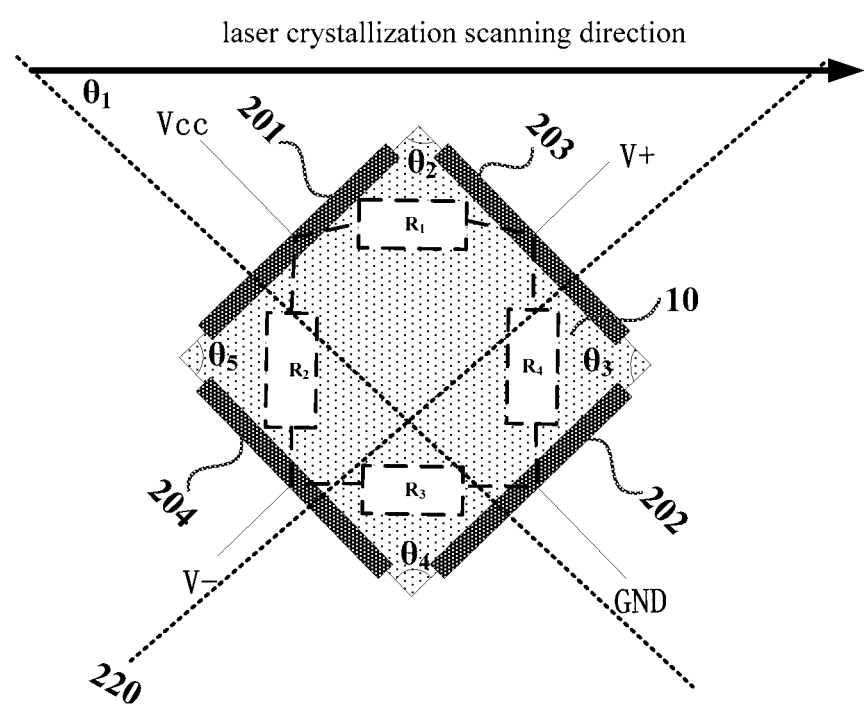
FIG. 12 is a structural diagram showing a semiconductor pressure-sensing touch device according to a conventional technology.

FIG. 12 is a structural diagram showing a pressure-sensing touch device in a related art. As shown in FIG. 12, different from FIG. 10, $\theta_2=\theta_3=\theta_4=\theta_5$, the semiconductor pressure-sensing touch device 10 is a square, and a laser crystallization scanning direction is the direction parallel to the long side of the first pressure-sensitive resistor $R_1$ and perpendicular to the long side of the second pressure-sensitive resistor $R_2$. Since the direction of the current which flows through the first pressure-sensitive resistor $R_1$ and the second pressure-sensitive resistor $R_2$ is different from the laser crystallization scanning direction, and the direction of the current which flows through the third pressure-sensitive resistor $R_3$ and the fourth pressure-sensitive resistor $R_4$ is different from the laser crystallization scanning direction, a slight difference in the resistances of the first pressure-sensitive resistor $R_1$, the second pressure-sensitive resistor $R_2$, the third pressure-sensitive resistor $R_3$ and the fourth pressure-sensitive resistor $R_4$ would occur, so that the balance condition $$\frac{R_1}{R_4} = \frac{R_2}{R_3}$$

of the bridge may not be satisfied, and $R_1$ and $R_3$ are both less than $R_2$ and $R_4$. When the pressure touch is not operated, $$\frac{R_1}{R_4} \neq \frac{R_2}{R_3},$$

so that the accuracy of the touch pressure detection is decreased.

Based on above, referring to FIG. 10, $\theta_2$ and $\theta_4$ are increased, or $\theta_3$ and $\theta_5$ are decreased, that is, the following conditions are satisfied:

When $0°<\theta_1<90°$, $\theta_2>\theta_3$; $\theta_4>\theta_5$;
When $90°<\theta_1<180°$, $\theta_2<\theta_3$; $\theta_4<\theta_5$.

By increasing the length of $R_1$ and $R_3$ in the direction parallel to the laser crystallization scanning direction or decreasing the length of $R_2$ and $R_4$ in the direction perpendicular to the laser crystallization scanning direction, the resistances of $R_1$ and $R_3$ are increased, or the resistances of $R_2$ and $R_4$ are decreased, which enables the semiconductor pressure-sensing touch device 10 to satisfy the initial balance condition of the bridge $$\frac{R_1}{R_4} = \frac{R_2}{R_3}.$$

Therefore, the accuracy of the touch pressure detection is increased.

Figure 13:
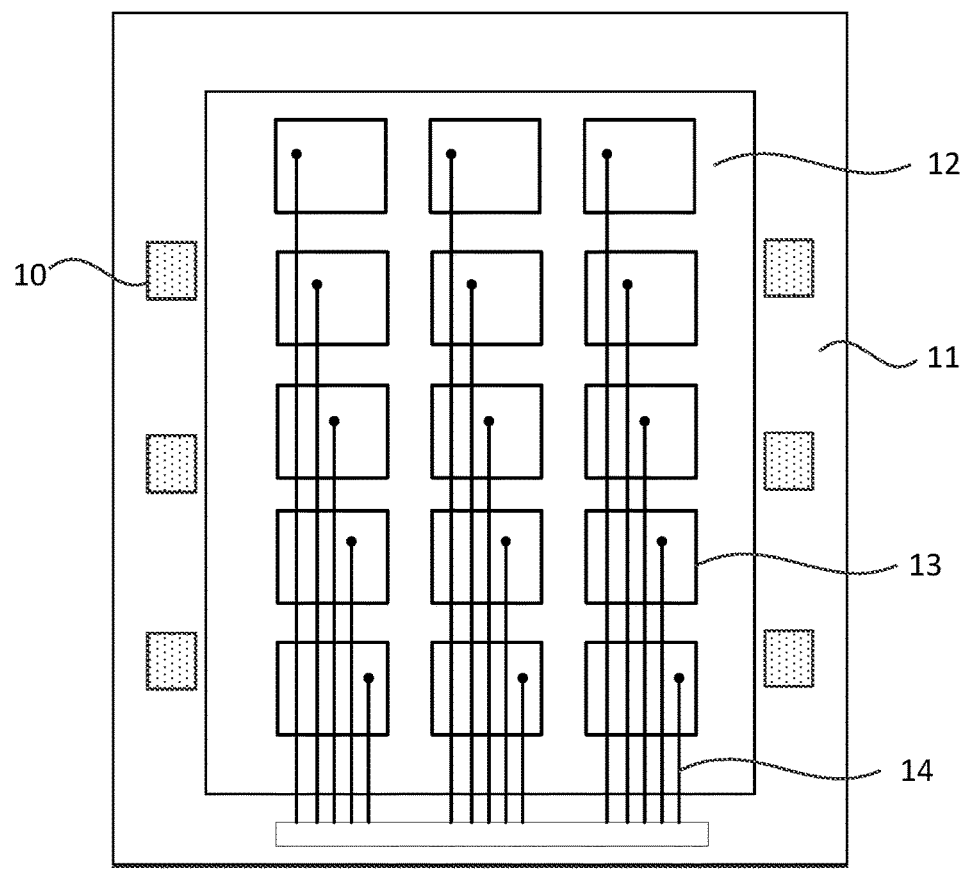
FIG. 13 is a structural diagram showing another such display panel according to an embodiment of the present disclosure.

Based on above embodiments, a plurality of touch position detecting electrodes may be disposed in the display region of the touch display panel to achieve the touch position detection. The touch display panel provided by the present disclosure, and the semiconductor pressure-sensing touch device is disposed in a non-display region of the touch display panel, and a plurality of touch position detecting electrodes are disposed in a display region of the touch display panel; and the touch display panel further includes a plurality of touch position wires; and each of the plurality of touch position wires is electrically connected to a respective one of the plurality of touch position detecting electrodes. FIG. 13 is a structural diagram showing another touch display panel according to an embodiment of the present disclosure. Referring to FIG. 13, the semiconductor pressure-sensing touch device 10 is disposed in a non-display region 11 of the touch display panel, and a plurality of touch position detecting electrodes are disposed in a display region 12 of the touch display panel, the plurality of the touch position detecting electrodes include a plurality of self-capacitance touch position detecting electrode blocks 13; and each of the self-capacitance touch position detecting electrode blocks 13 is electrically connected to a touch position detecting wire 14. A capacitance is formed by the self-capacitance touch position detecting electrode block 13 and ground, the touch position is detected through a capacitance variation between each of the plurality of self-capacitance touch position detecting electrode blocks 13 and ground.

Figure 14:
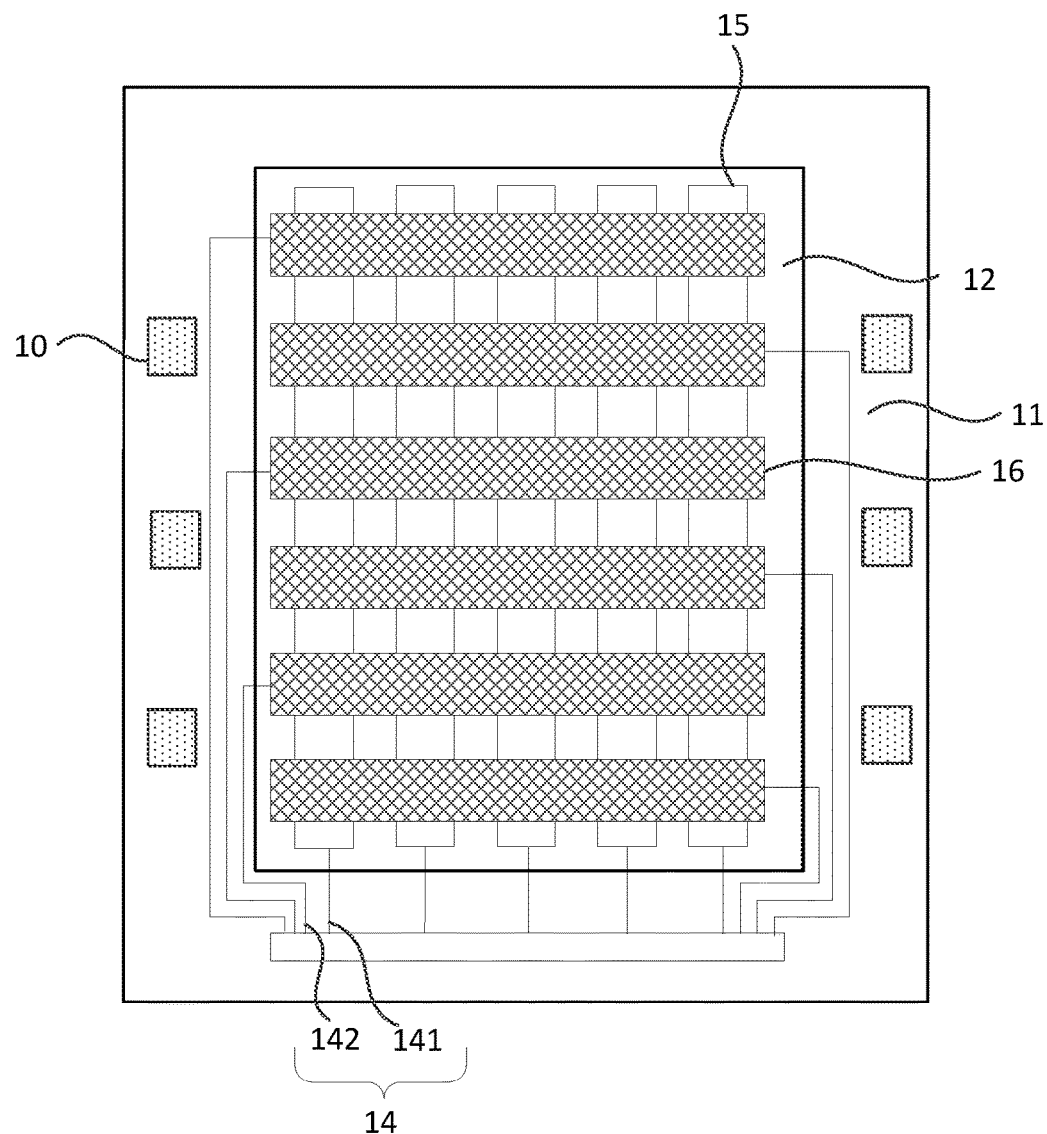
FIG. 14 is a structural diagram showing another touch display panel according to an embodiment of the present disclosure.

FIG. 14 is a structural diagram showing another touch display panel according to an embodiment of the present disclosure, referring to FIG. 14, the plurality of the touch position detecting electrodes include a plurality of mutual-capacitance touch position detection driving electrodes 15 and a plurality of mutual-capacitance touch position detection sensing electrodes 16; and the touch position wires 14 include touch position driving wires 141 and touch position sensing wires 142; each of the plurality of mutual-capacitance touch position detection sensing electrode 16 is electrically connected to a respective one of the plurality of touch position sensing wires 142, and each of the plurality of mutual-capacitance touch position detection driving electrodes 15 is electrically connected to a respective one of the plurality of touch position driving wires 141. The touch position can be detected by detecting the resistance variation between the plurality of mutual-capacitance touch position detection sensing electrodes 15 and the plurality of mutual-capacitance touch position detection driving electrodes 16.

In one embodiment, each driving period of the touch display panel provided by the present disclosure includes a display stage and a touch stage; and the touch stage includes a touch position detecting stage and a pressure-sensing touch stage; the touch position detecting and the touch pressure detecting may be operated in different times. Namely, the touch position detection in the touch position detecting stage is performed by the plurality of the touch position detecting electrodes, and the touch pressure detection in the pressure-sensing touch stage is performed by the semiconductor pressure-sensing touch device.

In one embodiment, the touch position detecting and the touch pressure detecting may be operated simultaneously. Namely, each driving period of the touch display panel includes a display stage and a touch stage; the plurality of the touch position detecting electrodes and the semiconductor pressure-sensing touch device perform the touch position detection and the touch pressure detection in the touch stage, respectively.

Figure 15:
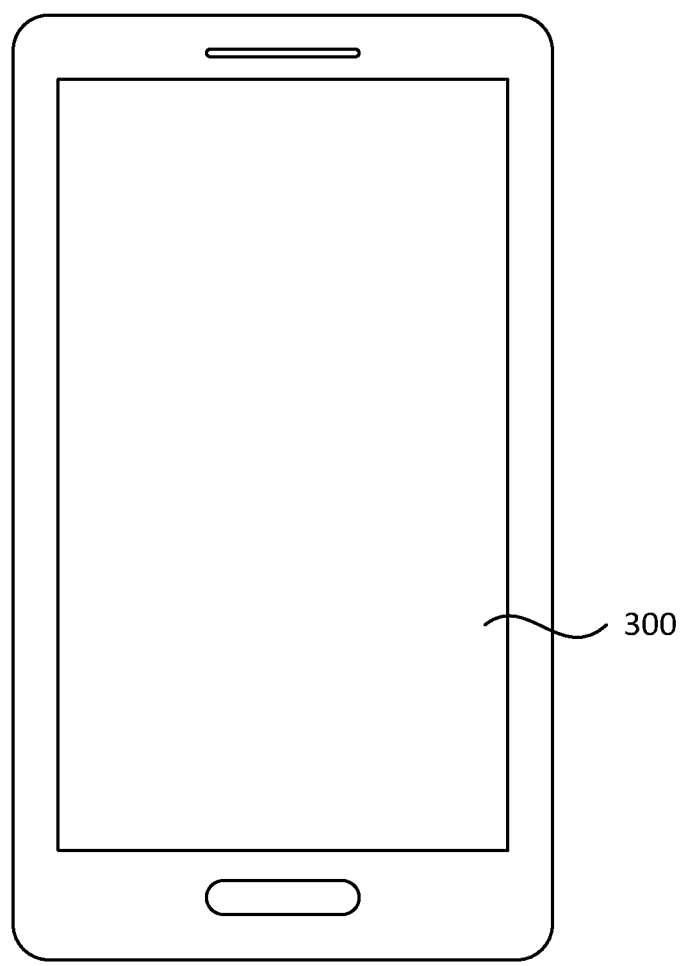
FIG. 15 is a structural diagram showing a touch display device according to an embodiment of the present disclosure.

The present disclosure further provides a touch display device, and FIG. 15 is a structural diagram showing a touch display according to an embodiment of the present disclosure. The touch display device shown in FIG. 15 includes: a touch display panel 300 provided by above mentioned embodiments. It should be noted, a touch display device provided by the present disclosure further includes circuits and devices which are configured to support the working of the touch display device. The above mentioned touch display device may be one of a mobile phone, a tablet computer, an E-book and a digital photo frame.

Although the present disclosure is described in detail through above embodiments, the present disclosure is not only limited to above embodiments. The present disclosure can also include more other equivalent embodiments without deviating from conceptions of the present disclosure. A scope of the present disclosure is determined by a scope of attached claims.

What is claimed is:

1. A touch display panel, comprising:
at least one semiconductor pressure-sensing touch device, wherein
the semiconductor pressure-sensing touch device comprises a first pressure-sensitive resistor, a second pressure-sensitive resistor, a third pressure-sensitive resistor and a fourth pressure-sensitive resistor; wherein a first end of the first pressure-sensitive resistor and a first end of the second pressure-sensitive resistor are connected to a first power inputting terminal, a second end of the first pressure-sensitive resistor and a first end of the fourth pressure-sensitive resistor are connected to a first sense signal measuring terminal, a second end of the fourth pressure-sensitive resistor and a second end of the third pressure-sensitive resistor are connected to a second power inputting terminal, a first end of the third pressure-sensitive resistor and a second end of the second pressure-sensitive resistor are connected to a second sense signal measuring terminal; wherein $$\frac{L_1}{W_1} > \frac{L_2}{W_2}; \frac{L_1}{W_1} > \frac{L_4}{W_4}; \frac{L_3}{W_3} > \frac{L_2}{W_2}; \frac{L_3}{W_3} > \frac{L_4}{W_4};$$

so that when no touch pressure is applied to touch display panel, $$\frac{R_1}{R_4} = \frac{R_2}{R_3};$$

wherein $L_1$ is a length of the first pressure-sensitive resistor in the direction parallel to a laser crystallization scanning direction of the semiconductor pressure-sensing touch device, and $L_3$ is a length of the third pressure-sensitive resistor in the direction parallel to the laser crystallization scanning direction of the semiconductor pressure-sensing touch device; $W_1$ is the length of the first pressure-sensitive resistor in the direction perpendicular to the laser crystallization scanning direction of the semiconductor pressure-sensing touch device and $W_3$ is the length of the third pressure-sensitive resistor in the direction perpendicular to the laser crystallization scanning direction of the semiconductor pressure-sensing touch device; $L_2$ is a length of the second pressure-sensitive resistor in the direction perpendicular to the laser crystallization scanning direction of the semiconductor pressure-sensing touch device and $L_4$ is a length of the fourth pressure-sensitive resistor in the direction perpendicular to the laser crystallization scanning direction of the semiconductor pressure-sensing touch device; $W_2$ is the length of the second pressure-sensitive resistor in the direction parallel to the laser crystallization scanning direction of the semiconductor pressure-sensing touch device and $W_4$ is the length of the fourth pressure-sensitive resistor in the direction parallel to the laser crystallization scanning direction of the semiconductor pressure-sensing touch device; and $R_1$, $R_2$, $R_3$ and $R_4$ represent the resistances of the first pressure-sensitive resistor, the second pressure-sensitive resistor, the third pressure-sensitive resistor and the fourth pressure-sensitive resistor of the touch display panel without applied pressure, respectively;

wherein the semiconductor pressure-sensing touch device further comprises a first connecting terminal, a second connecting terminal, a third connecting terminal and a fourth connecting terminal disposed at four sides of a polygon separately, wherein the first connecting terminal is electrically connected to the first power inputting terminal, the second connecting terminal is electrically connected to the second power inputting terminal, the third connecting terminal is electrically connected to the first sense signal measuring terminal, the fourth connecting terminal is electrically connected to the second signal measuring terminal;

wherein a first line is a line where the first connecting terminal and the second connecting terminal are located, and a second line is a line where the third connecting terminal and the fourth connecting terminal are located;

wherein $\theta_1$ is an angle formed between the first line and the laser crystallization scanning direction of the semiconductor pressure-sensing touch device, when $0°<\theta_1<90°$, formulas $\theta_2>\theta_3$ and $\theta_4>\theta_5$ are satisfied; when $90°<\theta_1<180°$, formulas $\theta_2<\theta_3$ and $\theta_4<\theta_5$ are satisfied;

wherein $\theta_2$ is an angle formed between a first side of the polygon where the first connecting terminal is located and a third side of the polygon where the third connecting terminal is located, $\theta_3$ is an angle formed between a second side of the polygon where the second connecting terminal is located and the third side of the polygon where the third connecting terminal is located, $\theta_4$ is an angle formed between the second side of the polygon where the second connecting terminal is located and a fourth side of the polygon where the fourth connecting terminal is located and $\theta_5$ is an angle formed between the first side of the polygon where the first connecting terminal is located and the fourth side of the polygon where the fourth connecting terminal is located.

2. The touch display panel according to claim 1, wherein $L_1>L_2$; $L_1>L_4$; $L_3>L_2$; $L_3>L_4$; and $W_1<W_2$; $W_1<W_4$; $W_3<W_2$; $W_3<W_4$.

3. The touch display panel according to claim 1, wherein $L_1>L_2$; $L_1>L_4$; $L_3>L_2$; $L_3>L_4$.

4. The touch display panel according to claim 1, wherein $W_1<W_2$; $W_1<W_4$; $W_3<W_2$; $W_3<W_4$.

5. The touch display panel according to claim 1, wherein $R_1=R_2=R_3=R_4$; $L_1=L_3$; $L_2=L_4$; $W_1=W_3$; $W_2=W_4$.

6. The touch display panel according to claim 1, wherein the first pressure-sensitive resistor, the second pressure-sensitive resistor, the third pressure-sensitive resistor and the fourth pressure-sensitive resistor are made of polysilicon material which is formed by performing the laser crystallization scanning on amorphous silicon material.

7. The touch display panel according to claim 1, wherein the display panel comprises a first extension direction and a second extension direction, wherein the first extension direction and the second extension direction are configured to be intersected with each other; a component of extension length of the first pressure-sensitive resistor from the first end to the second end in the first extension direction is longer than that in the second extension direction, and a component of extension length of the second pressure-sensitive resistor from the first end to the second end in the second extension direction is longer than that in the first extension direction, and a component of extension length of the third pressure-sensitive resistor from the first end to the second end in the first extension direction is longer than that in the second extension direction, and a component of extension length of the fourth pressure-sensitive resistor from the first end to the second end thereof in the second extension direction is longer than that in the first extension direction.

8. The touch display panel according to claim 7, wherein the first extension direction is the laser crystallization scanning direction of the semiconductor pressure-sensing touch device; the second extension direction is perpendicular to the laser crystallization scanning direction of the semiconductor pressure-sensing touch device.

9. The touch display panel according to claim 1, wherein the first pressure-sensitive resistor, the second pressure-sensitive resistor, the third pressure-sensitive resistor and the fourth pressure-sensitive resistor each are a rectangle.

10. The touch display panel according to claim 9, wherein a connecting wire between the first end and the second end of the first pressure-sensitive resistor and a connecting wire between the first end and the second end of the third pressure-sensitive resistor are parallel to the laser crystallization scanning direction of the semiconductor pressure-sensing touch device; and a connecting wire between the first end and the second end of the second pressure-sensitive resistor and a connecting wire between the first end and the second end of the fourth pressure-sensitive resistor are perpendicular to the laser crystallization scanning direction of the semiconductor pressure-sensing touch device.

11. The touch display panel according to claim 1, further comprising:

a plurality of thin film transistors, wherein each of the thin film transistors comprises an active layer;

wherein the semiconductor pressure-sensing touch device and the active layer are manufactured in a same layer.

12. The touch display panel according to claim 1, wherein the semiconductor pressure-sensing touch device is disposed in a non-display region of the touch display panel, and a plurality of touch position detecting electrodes are disposed in a display region of the touch display panel; and the touch display panel further comprises a plurality of touch position wires, wherein each of the plurality of touch position wires is electrically connected to a respective one of the plurality of touch position detecting electrodes.

13. The touch display panel according to claim 12, wherein
the plurality of the touch position detecting electrodes comprise a plurality of self-capacitance touch position detecting electrode blocks;
a touch position is detected through a capacitance variation between a respective one of the plurality of the self-capacitance touch position detecting electrode block and ground.

14. The touch display panel according to claim 12, wherein
the plurality of the touch position detecting electrodes comprise a plurality of mutual-capacitance touch position detection driving electrodes and a plurality of mutual-capacitance touch position detection sensing electrodes;
wherein the touch position wires comprise touch position driving wires and touch position sensing wires; and
each of the plurality of mutual-capacitance touch position detection sensing electrodes is electrically connected to a respective one of the touch position sensing wires, and each of the plurality of mutual-capacitance touch position detection driving electrode is electrically connected to a respective one of the touch position driving wires; and
the touch position is detected by detecting the capacitance variation between the plurality of mutual-capacitance touch position detection sensing electrodes and the plurality mutual-capacitance touch position detection driving electrodes.

15. The touch display panel according to claim 12, wherein
each driving period of the touch display panel comprises a display stage and a touch stage; wherein the touch stage comprises a touch position detecting stage and a pressure-sensing touch stage; and
the touch position detection in the touch position detecting stage is performed by the plurality of the touch position detecting electrodes, the touch pressure detection in the pressure-sensing touch stage is performed by the semiconductor pressure-sensing touch device.

16. A touch display device, comprising:
a touch display panel, wherein the touch display panel comprises: at least one semiconductor pressure-sensing touch device,
wherein
the semiconductor pressure-sensing touch device comprises a first pressure-sensitive resistor, a second pressure-sensitive resistor, a third pressure-sensitive resistor and a fourth pressure-sensitive resistor; wherein a first end of the first pressure-sensitive resistor and a first end of the second pressure-sensitive resistor are connected to a first power inputting terminal, a second end of the first pressure-sensitive resistor and a first end of the fourth pressure-sensitive resistor are connected to a first sense signal measuring terminal, a second end of the fourth pressure-sensitive resistor and a second end of the third pressure-sensitive resistor are connected to a second power inputting terminal, a first end of the third pressure-sensitive resistor and a second end of the second pressure-sensitive resistor are connected to a second sense signal measuring terminal; wherein $$\frac{L_1}{W_1} > \frac{L_2}{W_2}; \frac{L_1}{W_1} > \frac{L_4}{W_4}; \frac{L_3}{W_3} > \frac{L_2}{W_2}; \frac{L_3}{W_3} > \frac{L_4}{W_4};$$

so that when no touch pressure is applied to the touch display panel, $$\frac{R_1}{R_4} = \frac{R_2}{R_3};$$

wherein $L_1$ is a length of the first pressure-sensitive resistor in the direction parallel to a laser crystallization scanning direction of the semiconductor pressure-sensing touch device, and $L_3$ is a length of the third pressure-sensitive resistor in the direction parallel to the laser crystallization scanning direction of the semiconductor pressure-sensing touch device; $W_1$ is the length of the first pressure-sensitive resistor in the direction perpendicular to the laser crystallization scanning direction of the semiconductor pressure-sensing touch device and $W_3$ is the length of the third pressure-sensitive resistor in the direction perpendicular to the laser crystallization scanning direction of the semiconductor pressure-sensing touch device; $L_2$ is a length of the second pressure-sensitive resistor in the direction perpendicular to the laser crystallization scanning direction of the semiconductor pressure-sensing touch device and $L_4$ is a length of the fourth pressure-sensitive resistor in the direction perpendicular to the laser crystallization scanning direction of the semiconductor pressure-sensing touch device; $W_2$ is the length of the second pressure-sensitive resistor in the direction parallel to the laser crystallization scanning direction of the semiconductor pressure-sensing touch device and $W_4$ is the length of the fourth pressure-sensitive resistor in the direction parallel to the laser crystallization scanning direction of the semiconductor pressure-sensing touch device; and $R_1$, $R_2$, $R_3$ and $R_4$ represent the resistances of the first pressure-sensitive resistor, the second pressure-sensitive resistor, the third pressure-sensitive resistor and the fourth pressure-sensitive resistor of the touch display panel without applied pressure, respectively;
wherein the semiconductor pressure-sensing touch device further comprises a first connecting terminal, a second connecting terminal, a third connecting terminal and a fourth connecting terminal disposed at four sides of a polygon separately, wherein the first connecting terminal is electrically connected to the first power inputting terminal, the second connecting terminal is electrically connected to the second power inputting terminal, the third connecting terminal is electrically connected to the first sense signal measuring terminal, the fourth connecting terminal is electrically connected to the second signal measuring terminal;
wherein a first line is a line where the first connecting terminal and the second connecting terminal are located, and a second line is a line where the third connecting terminal and the fourth connecting terminal are located;
wherein $\theta_1$ is an angle formed between the first line and the laser crystallization scanning direction of the semiconductor pressure-sensing touch device, when $0°<\theta_1<90°$, formulas $\theta_2>\theta_3$ and $\theta_4>\theta_5$ are satisfied; when $90°<\theta_1<180°$, formulas $\theta_2<\theta_3$ and $\theta_4<\theta_5$ are satisfied;

wherein $\theta_2$ is an angle formed between a first side of the polygon where the first connecting terminal is located and a third side of the polygon where the third connecting terminal is located, $\theta_3$ is an angle formed between a second side of the polygon where the second connecting terminal is located and the third side of the polygon where the third connecting terminal is located, $\theta_4$ is an angle formed between the second side of the polygon where the second connecting terminal is located and a fourth side of the polygon where the fourth connecting terminal is located and $\theta_5$ is an angle formed between the first side of the polygon where the first connecting terminal is located and the fourth side of the polygon where the fourth connecting terminal is located.

17. The touch display device according to claim 16, wherein the touch display panel comprises a first extension direction and a second extension direction, wherein the first extension direction and the second extension direction are configured to be intersected with each other;

a component of extension length of the first pressure-sensitive resistor from the first end to the second end in the first extension direction is longer than that in the second extension direction, and a component of extension length of the second pressure-sensitive resistor from the first end to the second end in the second extension direction is longer than that in the first extension direction, and a component of extension length of the third pressure-sensitive resistor from the first end to the second end in the first extension direction is longer than that in the second extension direction, and a component of extension length of the fourth pressure-sensitive resistor from the first end to the second end thereof in the second extension direction is longer than that in the first extension direction.

18. The touch display device according to claim 17, wherein the first extension direction is the laser crystallization scanning direction of the semiconductor pressure-sensing touch device; the second extension direction is perpendicular to the laser crystallization scanning direction of the semiconductor pressure-sensing touch device.

19. The touch display device according to claim 16, further comprising a display panel, wherein the display panel comprises:

a plurality of thin film transistors, wherein each of the thin film transistors comprises an active layer;

wherein the semiconductor pressure-sensing touch device and the active layer are manufactured in a same layer.

* * * * *